United States Patent Office 3,221,048
Patented Nov. 30, 1965

3,221,048
POLYCHLOROPHENYLACETIC ACIDS AND PROCESS FOR SAME
Edward D. Weil, Lewiston, Edwin Dorfman, Grand Island, and Jack S. Newcomer, Wilson, N.Y., assignors to Hooker Chemical Corporation, Niagara Falls, N.Y., a corporation of New York
No Drawing. Filed May 2, 1960, Ser. No. 25,845
10 Claims. (Cl. 260—515)

This application is a continuation-in-part of copending application Serial No. 692,046 filed October 10, 1957, now abandoned.

This invention relates to new compositions of matter having valuable utility as herbicidal synergists. More specifically, this invention resides in the concept of specific positioned isomers of chlorinated phenylacetic acids identified as 2,3,5-trichlorophenylacetic acid and 2,3,5,6-tetrachlorophenylacetic acid. Included also in the concept of this invention is a synergistic herbicidal composition comprising from five to ninety-five percent 2,3,6-trichlorophenylacetic acid and the remainder a composition selected from the group consisting of dichlorophenylacetic acids, 2,3,5-trichlorophenylacetic acid, 2,4,5-α-tetrachlorophenylacetic acid, 2,3,5,6-tetrachlorophenylacetic acid and mixtures thereof.

New compositions of matter 2,3,5-trichlorophenylacetic acid and 2,3,5,6-tetrachlorophenylacetic acid have been found to be valuable herbicidal synergists when added to 2,3,6-trichlorophenylacetic acid. These new compositions may be prepared as follows:

2,3,5-TRICHLOROPHENYLACETIC ACID

To 113 grams of 2,3,5-trichlorobenzoic acid in ether was added 25 grams of lithium aluminum hydride with water-bath cooling. When all sign of reaction subsided, the complex was decomposed by cautious addition of dilute hydrochloric acid. On separation of the ether layer and evaporation, 81 grams of 2,3,5-trichlorobenzyl alcohol, a white solid which when recrystallized from hot water melted at one hundred and seven degrees to one hundred and eight degrees centigrade, was obtained.

Hydrogen chloride was passed into 60 g. of 2,3,5-trichlorobenzyl alcohol plus 3 grams of zinc chloride at one hundred and sixty to one hundred and seventy degrees centigrade, over one day. The material was then distilled and a fraction boiling at eighty degrees per 0.3 millimeter taken as 2,3,5-trichlorobenzyl chloride, yield 50 grams. This was dissolved in 90 cc. of methanol, 13 grams of sodium cyanide plus 13 cc. of water was added, and the mixture refluxed with stirring for four hours. The mixture was then stripped free of methanol and the organic product washed with water, to obtain 2,3,5-trichlorobenzyl cyanide which was then distilled at one hundred and fifteen degrees per 0.1 millimeter. The residue on cooling yielded crystals of 2,3,5-trichlorophenylacetamide, melting point one hundred and seventy-one to one hundred and seventy-two degrees centigrade (recrystallized from benzene). The distilled cyanide when recrystallized from benzene melted at sixty-four to sixty-five degrees centigrade.

Refluxing of the cyanide for one hour with fifty percent $H_2SO_4$ yielded 2,3,5-trichlorophenylacetic acid as a colorless solid which after recrystallization from benzene melted at 143.5 to one hundred and forty-four degrees centigrade.

2,3,5,6-TETRACHLOROPHENYLACETIC ACID

Chlorine was passed into p-toluenesulfonyl chloride at seventy to one hundred and ten degrees centigrade in the presence of three percent antimony chloride until four molar equivalents of hydrogen chloride had evolved. This product is then treated passed with superheated steam at two hundred to three hundred degrees centigrade and the steam distillate, comprising 2,3,5,6-tetrachlorotoluene is collected. This substance, a waxy solid, is chlorinated by passage of chlorine at one hundred and five to one hundred and eleven degrees centigrade under illumination by a mercury vapor lamp until nearly one molar equivalent of hydrogen chloride is evolved. This product is then distilled, taking the cut one hundred and forty-six to one hundred and forty-eight degrees per 5 millimeters as 2,3,5,6-tetrachlorobenzyl chloride, a colorless liquid, $N_{21}^D$ 1.6120.

A mixture of 88 grams of this chloride, 25 grams of sodium cyanide, 22 cc. of water, and 100 cc. of ethanol were refluxed for four hours, then diluted with water, and the organic layer which precipitated was separated off. This crude 2,3,5,6-tetrachlorobenzyl cyanide was refluxed for half an hour with 140 cc. of water and 150 cc. of sulfuric acid, cooled and diluted, and the precipitated solids taken up in aqueous caustic and the caustic-insolubles separated by decantation. The aqueous solution of sodium 2,3,5,6-tetrachlorophenylacetate was acidified, the precipitate removed by filtration, and the crude solid recrystallized from dilute ethanol to obtain substantially pure 2,3,5,6-tetrachlorophenylacetic acid, melting point one hundred and sixty-nine to one hundred and seventy-one degrees centigrade.

The utility and a preparation of 2,3,6-trichlorophenylacetic acid is disclosed in copending application Serial No. 692,046 filed in the United States Patent Office on October 10, 1957, now abandoned, of which this application is a continuation in part. In this earlier filed application the use of 2,3,6-trichlorophenylacetic acid as a potent herbicide was discussed. The preparation of 2,3,6-trichlorophenylacetic acid is commercially very difficult and its production as a pure isomer is economically untenable. Since this difficulty does exist there is a definite advantage in a process which provides for the production of 2,3,6-trichlorophenylacetic acid wherein the by-product isomers contribute to the activity of the mixture by synergistic action.

It has surprisingly been found that not only do new compositions 2,3,5-tri and 2,3,5,6-tetra chlorophenylacetic acids synergise 2,3,6-trichlorophenylacetic acid but dichlorophenylacetic acids and 2,4,5-α-tetrachlorophenylacetic acid also do (the production of the last named compound is given in copending application Serial No. 797,892, now United States Patent 3,134,808, issued May 26, 1964). These compounds when used in mixture or by themselves exhibit a substantial synergising action on the 2,3,6-isomer. This finding was unexpected since these compounds when tested by themselves exhibit substantially no herbicidal activity or only a low order of activity. This is in contrast to the chlorobenzoic acid herbicide series where 2,5- di-, 2,3,5-tri and 2,3,5,6-tetra chlorobenzoic acids have substantial activity per se.

The 2,3,6-trichlorophenylacetic acid was found to be synergised by:

2,3-, 2,5-, 2,6-, and 3,4-dichlorophenylacetic acids,
2,3,5-trichlorophenylacetic acid, 2,3,5,6-tetrachlorophenylacetic acid, 2,4,5,α-tetrachlorophenylacetic acid or mixtures thereof.

Substantially the same effect was realized when using the amides, ester, or salts rather than the chlorophenylacetic acids. Other isomers of polychlorophenylacetic acid may be present in this composition in small amounts. Compositions of this invention include 2,3,6-trichlorophenylacetic acid admixed in the range of five to ninety-five percent with the above discussed polychlorophenylacetic acids. The use of any of above derivatives or salts does not depart from the spirit of this invention, since field conditions or uses may require using a derivative or salt rather than the acid per se. In determining whether it is advantageous to use in the field any of the aforementioned derivatives or salts of the acids of this invention rather than the acid per se, one determines the field conditions and selects the particular derivative or salt having the required characteristics to meet such conditions. Also suitable in place of the acid per se are the derivatives hydrolyzable by water to the acids; such derivatives are the acid chlorides, anhydrides, esters, and amides, and analogs thereof in which sulfur replaces oxygen. The amide derivative is conveniently prepared by partial hydrolysis of the corresponding nitriles, or by introduction of ammonia under dehydrating conditions into the corresponding acid. The other derivatives are made from the acid by methods well known to the art.

The dichlorophenylacetic acids are produced conveniently in admixture with one another by chlorination of toluene to substantially two chlorine atoms in the ring, further chlorination to place one chlorine in the side chain, and then treatment with alkali cyanide followed by hydrolysis as in the trichlorophenylacetic acid synthesis outlined above. It is also convenient to produce a mixture of dichloro- and trichlorophenylacetic acids containing amongst the trichloro-isomers about fifty percent 2,3,6- by chlorinating toluene to about two and below three chlorine atoms in the ring, then proceeding with the synthesis outlined above. A mixture of trichlorophenylacetic acid containing about fifty percent 2,3,6-tri of the tri isomers and about fifty percent 2,3,5,6-tetra of the tetra isomers is conveniently made by chlorinating toluene to above three and below four chlorine atoms on the ring, and proceeding as in the above outlined synthesis. These last two processes are especially economical since they permit any crude chlorinated toluene in the range from two to four to be employed for the preparation of an effective herbicide mixture without the need for the arduous fractional distillation which would otherwise be needed to isolate the trichlorotoluene fraction. The di- and 2,3,5,6-tetrachloro- isomers contribute substantially to the herbicidal activity when present in these mixtures with 2,3,6-trichlorophenylacetic acid despite the fact that if separated out and tested alone, the di- and tetrachloro-acids lack activity.

An alternate synthesis to the above comprises the direct chlorination of phenylacetic acid in the presence of iodine or a Lewis acid catalyst such as ferric chloride, antimony chloride, molybdenum chloride, etc. Chlorination can be carried out to give an average of from two to four chlorine atoms in the ring. Although the percentage of 2,3,6-trichlorophenylacetic acid is small in such mixtures, the synergising action of the dichlorophenylacetics and 2,3,5,6-tetrachlorophenylacetic acid enhances the activity of the mixture sufficiently to make such mixtures economically useful herbicides.

The preparation of a mixture of 2,3,6-trichlorophenylacetic acid plus 2,4,5,α-tetrachlorophenylacetic acid is accomplished with surprising ease by the direct chlorination of a mixture of 2,3,6- and 2,4,5-trichlorophenylacetic acid using thermal or photochemical activation of the chlorine to bring about side-chain chlorination. It is found that 2,4,5-trichlorophenylacetic acid undergoes chlorination in the alpha-position much more rapidly than does the 2,3,6-isomer, and therefore 2,4,5,α-tetrachlorophenylacetic acid is formed with relatively little 2,3,6,α-tetrachlorophenylacetic acid. Such of the latter as does form does not represent a waste, since this isomer is comparable in herbicidal activity to 2,3,6-trichlorophenylacetic acid and is even more active in foliar applications. In these mixtures the 2,4,5,α-tetrachlorophenylacetic acid is a strong synergist for 2,3,6-trichlorophenylacetic acid but, alone, this isomer is only a feeble herbicide.

The two processes described above, namely, the direct chlorination of phenylacetic acid to introduce chlorine onto the ring, and the thermal or photochemical chlorination of ring-chlorinated phenylacetic acid to introduce chlorine onto the side-chain, can be combined into a single process to make mixtures containing 2,3,6-tri- accompanied by 2,4,5,α-tetrachlorophenylacetic acid and/or dichlorinated ring-dichlorinated phenylacetic acid directly from phenylacetic acid. Such a combined process can either be done by gradually raising the temperature during the chlorination or by raising it step wise toward the end of chlorination, or by starting the chlorination initially at a high temperature. The first two modifications are preferred since they result in a greater percentage of the active 2,3,6-trichlorophenylacetic acid in the product. It is usually not necessary to remove the catalyst from the ring chlorination step in order to carry out the side-chain chlorination, since after about three chlorine atoms are introduced on the ring, the further ring chlorination goes imperceptibly and the side-chain chlorination rate is much greater.

A further modification of the chlorination of phenylacetic acid involves starting the chlorination at low temperature (below ninety degrees centigrade) to introduce more than two and less than three chlorine atoms on the ring and then gradually or suddenly raising the temperature (to ninety to one hundred and twenty degrees centigrade) to bring about side-chain chlorination which occurs preferentially on the dichlorophenylacetic acids relative to the trichlorophenylacetic acids, resulting in product mixtures containing mainly α-monochlorinated ring-dichlorinated phenylacetic acids plus ring-trichlorinated phenylacetic acids.

The preparation of a mixture of 2,3,6- and 2,3,5-trichlorophenylacetic acid can be effected only by a different route, since almost no 2,3,5-trichlorotoluene is formed by the usual direct Lewis acid catalyzed chlorination of toluene to the trichlorotoluene level, and very little is formed by direct chlorination of phenylacetic acid. We have found that the additive, rather than substitutive, chlorination of toluene or of benzyl chloride, followed by dehydrochlorination of the hexachloride affords a convenient route to trichlorobenzyl chloride containing substantial 2,3,6- and 2,3,5-trichlorobenzyl chloride.

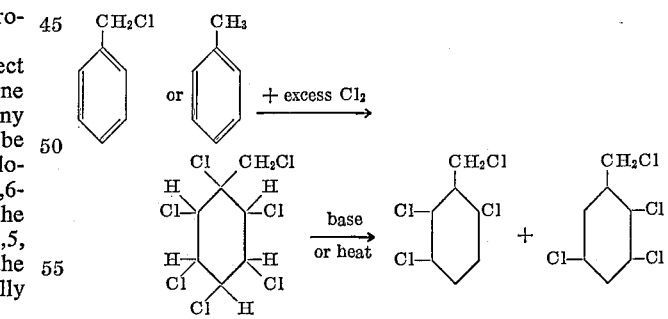

The dehydrochlorination can be carried out by heating the chlorine addition product, with or without a dehydrochlorination catalyst, or by treatment with a base such as caustic or lime, or even by use of sodium cyanide which acts both as a base for dehydrochlorination and as a reagent for the replacement of side-chain chlorine by the cyanide grouping.

An alternate route to mixtures of 2,3,6- and 2,3,5-trichlorophenylacetic acids is the *additive* rather than substitutive chlorination of phenylacetic acid using photochemical catalysts at low temperatures (preferably below 0 degrees centigrade) followed by dehydrochlorination of the resultant hexachloride by the use of heat or a base.

The herbicides of this invention are used as such or in admixture with solvents, carriers, emulsifiers, wetting agents, sequestrants, or other herbicides as is the customary formulation practice in the herbicide art.

The following examples further illustrate this invention. For purposes of rigorous characterization and structure proof, several unequivocal synthesis are given of the hitherto unknown isomers without intending to imply that these isomers would be commercially prepared by such synthesis routes.

*Example 1.—2,4,5,α-tetrachlorophenylacetic acid*

Twenty-four parts by weight of 2,4,5-trichlorophenylacetic acid is warmed until fusion occurs and chlorine gas is then passed in under illumination by a 250-watt mercury vapor lamp. When the weight of the reaction mixture reached 29 grams, the mixture was recrystallized from carbon tetrachloride, giving a colorless crystalline product, melting point one hundred and fifty-seven degrees to one hundred and fifty-nine degrees centigrade. The neutralization equivalent by titration with NaOH to form the sodium salt was two hundred and seventy-four (theory for $C_8H_4Cl_4O_2$, 274).

*Analysis:*
Calculated for $C_8H_4Cl_4O_2$, total Cl—51.8
Found for $C_8H_4Cl_4O_2$, total Cl—52.3
Calculated Cl hydrolyzable by alcohol KOH—12.9
Found Cl hydrolyzable by alcoholic KOH—12.7

*Example 2.—Dichlorophenylacetic acid and mixed polychloroacetic acids via chlorination of toluene*

Toluene was chlorinated at fifty to sixty degrees centigrade in the presence of one percent ferric chloride until two moles of hydrogen chloride was evolved. The mixture was then fractionally distilled, the lower boiling ten percent and the higher boiling ten percent being discarded. The center fraction comprising eighty percent of the crude was found by infrared to have about thirty percent 2,4-, twenty-five percent 2,5-, twenty percent 2,6-, five percent 3,4,- and ten to twenty percent 2,3-dichlorotoluene. This was converted by steps exactly analogous to those of Example 1 into the corresponding dichlorophenylacetic acid mixture. This product was a waxy solid of indefinite melting point. Titration of a weighed sample with 0.1-N sodium hydroxide required 10.00 milliliters for 205 milligrams, which is correct for a dichlorophenylacetic acid. By methods analogous to the above but omitting the fractionation of the chlorinated toluene, polychlorinated phenylacetic acids were made having chlorine contents in the range of two to four chlorine atoms per mole. These products were all waxy solids of indefinite melting point.

*Example 3*

A solution of 212 parts of phenylacetic acid in an excess of liquid chlorine at minus twenty degrees centigrade was illuminated by a mercury arc amp for several hours. The excess chlorine was stripped under vacuum and the residual phenylacetic acid hexachloride was then added to an excess of aqueous caustic soda at twenty-five degrees centigrade. The release of chlorine by dehydrochlorination began immediately and could be followed by titration of aliquots by silver nitrate (Volhard method). When the theoretical chloride had been evolved, the alkaline solution was acidified to precipitate trichlorophenylacetic acid. This, by infrared, was found to contain twenty-eight percent 2,3,6-, about ten percent 2,3,5-, and the rest mainly 2,4,5-trichlorophenylacetic acid.

*Example 4*

Chlorine gas was bubbled into molten phenylacetic acid plus two percent ferric chloride plus one percent iodine at fifty-five to sixty degrees centigrade until the weight increase and the hydrogen chloride evolution indicated that two chlorine atoms per mole had been substituted by hydrogens. A sample of the melt was removed. The chlorine input was continued, and further samples were taken at 2.3, 2.7 and 3.0 chlorine atoms per mole.

Infrared examination showed the presence of nineteen percent 2,3,6-trichlorophenylacetic acid in the 2.3 Cl/mole product, thirty-two percent in the 2.7, and forty percent in the 3.0 Cl/mole product.

Each of these products, upon heating to ninety to one hundred and twenty degrees centigrade and further passage of chlorine underwent chlorination on the side-chain rather than on the ring, as evidenced by the fact that the further chlorine thus introduced was readily released as chloride ion upon treatment of the products with alcoholic KOH.

*Example 5*

Five hundred milliliters volume of a 1:1 by volume mixture of carbon tetrachloride and toluene was cooled to about minus sixty degrees centigrade and 1600 milliliters of liquid chlorine was then added over eighty minutes under illumination by a mercury arc lamp. The excess chlorine was allowed to boil off, and the residual mixture stripped to one hundred degrees centigrade at 0.1 millimeter pressure, leaving 800 grams of crude toluene hexachloride as a viscous syrup.

To 2340 milliliters of methanol was added alternately in portions 700 grams of crude toluene hexachloride and 583 grams of sodium hydroxide, allowing the exothermic reaction to cause the methanol to reflux. When the reaction appeared complete, the methanol was distilled off, water was added to the residue to dissolve the inorganic substances and the organic product, comprising 450 grams of liquid, was separated by decantation. This product was fractionally distilled, the fraction boiling one hundred and fourteen to one hundred and twenty-six degrees centigrade (fifteen millimeters) being taken as the trichlorotoluene fraction. This fraction was heated to one hundred to one hundred and thirty degrees centigrade and chlorine bubbled in under mercury arc illumination until the weight increase corresponded to ninety-one percent of the theoretical for conversion of trichlorotoluene to trichlorobenzyl chloride.

Two hundred grams of this trichlorobenzyl chloride was converted via trichlorobenzyl cyanide to trichlorophenylacetic acid following a procedure substantially the same as prescribed in Example 1. An infrared spectrum showed this product to be comprised principally of 2,3,6-, 2,4,5-, and 2,3,5-trichlorophenylacetic acid in the ratio of about 3:1:1.

*Example 6*

A mixture of 2,3,6-trichlorophenylacetic acid and 2,4,5-trichlorophenylacetic acid in the ratio of approximately 1:1 was heated to one hundred and ten degrees centigrade, and chlorine gas was bubbled into the resultant melt until one-half mole of hydrogen chloride had evolved per mole of total trichlorophenylacetic acid employed.

Examination of the mixture by infrared showed the main ingredients of the resultant mixture to be primarily unchanged 2,3,6-trichlorophenylacetic acid and 2,4,5,α-tetrachlorophenylacetic acid.

*Example 7*

The compositions of the invention and pure 2,3,6- and 2,4,5-trichlorophenylacetic acids were compared as herbicides by application at rates in the range of one to eight pounds per acre to soil seeded with representative weed species, namely, lambsquarters, ragweed, pigweed, chickweed, and others. After an untreated control area had developed a substantal population of these weeds, the weed control caused by the chemicals was evaluated. The relative weed control activity of the various compounds was evaluated compared to pure 2,3,6-trichlorophenylacetic acid which was assigned therefore a value of one. For instance, a compound requiring twice as high a rate to perform equally as well as pure 2,3,6-trichlorophenylacetic acid would have a rating of 0.5. The results of a number of such comparative tests are summarized in the following table. Calculated values based on the percent 2,3,6-trichlorophenylacetic acid in the mixtures, assuming no synergism, are also presented for comparison.

|  | Relative weed control activity (relative to pure 2,3,6-) | |
|---|---|---|
|  | Observed | Calc'd, assuming no synergism |
| Pure 2,3,6-trichlorophenylacetic acid | 1 |  |
| Pure 2,4,5-trichlorophenylacetic acid | 0.0 |  |
| Trichlorophenylacetic acid (50% 2,3,6-, 45% 2,4,5-, 10% 2,3,4) | 0.5 | 0.5 |
| Dichlorophenylacetic acid (free or trichlorophenylacetic acids) | 0.0-0.1 |  |
| Dichlorophenylacetic acid (containing 10% 2,3,6-trichlorophenylacetic acid | 0.3 | 0.1-0.2 |
| Polychlorophenylacetic acid (2.3 Cl/mole [1] approx. 19% 2,3,6-tri-) (product of Example 4) | 0.8 | 0.19 |
| Polychlorophenylacetic acid (2.7 Cl/mole [1] approx. 32% 2,3,6-tri-) (product of Example 4) | 0.9 | 0.32 |
| Polychlorophenylacetic acid (3.0 Cl/mole [1] approx. 40% 2,3,6-tri-) (product of Example 4) | 0.8 | 0.40 |
| Polychlorophenylacetic acid (3.5 Cl/mole [1] approx. 22% 2,3,6-tri-) (product of Example 4) | 0.4 | 0.22 |
| 2,3,5-trichlorophenylacetic acid | [2] 0.0 |  |
| 2,3,5,6-tetrachlorophenylacetic acid | [2] 0.0 |  |
| 2,4,5,α-tetrachlorophenylacetic acid | [2] 0.0 |  |
| 2,3,6-trichlorophenylacetic acid plus 2,4,5,α-tetrachlorophenylacetic acid (1:1 mixture) (product of Example 6) | 1 | 0.5 |
| 2,3,6-plus 2,3,5-trichlorophenylacetic acid (1:1 mixture) | 1 | 0.5 |

[1] Average composition based on percent total chlorine and/or neutralization equivalent. The chlorine was shown to be on the ring rather than on the side-chain by its failure to be released as chloride ion upon treatment with alcoholic KOH.
[2] Slight.

We claim:
1. A compound selected from the group consisting of 2,3,5-trichlorophenylacetic acid and 2,3,5,6-tetrachlorophenylacetic acid.
2. 2,3,5-trichlorophenylacetic acid.
3. 2,3,5,6-tetrachlorophenylacetic acid.
4. A process for the preparation of a mixture comprising 2,3,6-trichlorophenylacetc acid plus a herbicidally-synergizing amount of 2,4,5,α-tetrachlorophenylacetic acid which comprises passing at least one molar equivalent of chlorine calculated with respect to the amount of 2,4,5,α-tetrachlorophenylacetic acid to be produced into a mixture comprising the amount of 2,3,6-trichlorophenylacetc acid to be present in the end product and 2,4,5-trichlorophenylacetic acid in at least a molar equivalent amount with respect to the amount of 2,4,5,α-tetrachlorophenylacetic acid to be present in the end product, at a temperature in the range of about 90 to about 120 degrees centigrade.
5. The product produced by the process of claim 4.
6. A process for the preparation of mixtures of polychlorophenylacetic acids having more than two chlorine atoms per mole which comprises introducing chlorine into phenylacetic acid in the presence of a Lewis acid catalyst until at least two chlorine atoms have been introduced substitutively on the aromatic ring.
7. The mixed polychlorophenylacetic acid product produced by the process of claim 6.
8. The process according to claim 6 wherein the Lewis acid catalyst is ferric chloride.
9. A process for the preparation of mixtures of polychlorophenylacetic acids having more than two chlorine atoms per mole which comprises introducing chlorine into phenylacetic acid in the presence of a Lewis acid catalyst until at least two chlorine atoms have been introduced substitutively on the aromatic ring, elevating the temperature to a range from about 90 to about 120 degrees centigrade, and continuing introduction of chlorine until at least one chlorine atom has been introduced substitutively on the side chain.
10. A process for the preparation of a mixture comprising 2,3,6-trichlorophenylacetic acid, 2,3,5-trichlorophenylacetic acid and 2,4,5-trichlorophenylacetic acid, which comprises contacting phenylacetic acid with at least six gram-atoms of chlorine in the presence of actinic radiation at a temperature below about zero degrees centigrade and dehydrochlorinating the resultant product by treating with at least three molar equivalents of a base until three gram-atoms of hydrogen chloride are evolved.

References Cited by the Examiner
UNITED STATES PATENTS

| | | | |
|---|---|---|---|
| 2,341,867 | 2/1944 | Hitchcock | 71—2.6 |
| 2,370,394 | 2/1945 | Cass | 260—515 |
| 2,394,916 | 2/1946 | Jones | 71—2.6 |
| 2,444,905 | 7/1948 | Sexton | 71—2.6 |
| 2,843,470 | 7/1958 | Searle. | |
| 2,863,753 | 12/1958 | Wain | 71—2.6 |
| 2,890,243 | 6/1959 | Brown et al. | 260—515 |
| 2,977,212 | 3/1961 | Tischler | 71—2.6 |
| 3,005,694 | 10/1961 | Entemann | 260—515 X |
| 3,134,808 | 5/1964 | Weil et al. | 260—515 |

LORRAINE A. WEINBERGER, *Primary Examiner.*

CHARLES B. PARKER, LEON ZITVER, *Examiners.*